Nov. 28, 1950 — J. M. WALTER — 2,532,046
TABLE CLAMP FOR MACHINE TOOLS
Filed Nov. 15, 1946 — 2 Sheets-Sheet 2

INVENTOR.
JOHN M. WALTER.
BY Allen & Allen
ATTORNEYS.

Patented Nov. 28, 1950

2,532,046

UNITED STATES PATENT OFFICE 2,532,046

TABLE CLAMP FOR MACHINE TOOLS

John M. Walter, Cincinnati, Ohio, assignor to The G. A. Gray Company, Cincinnati, Ohio, a corporation of Ohio Application November 15, 1946, Serial No. 709,980

7 Claims. (Cl. 188—67)

My invention relates to devices for clamping a sliding table in machine tools in a selected position. As an example of a point of use of such a clamping or position retaining device, I have applied the device to the table of a planer type machine used for boring, drilling, and milling. In such a machine the work is secured to a table and can be moved transverse to the tools by the actuation of the table. It is, however, desirable in many operations that the work be immovable and the tools be moved into the work, in which case it is desirable to lock the table immovably, and by power.

In the past, so far as I am advised, such clamping has been provided for by forcing the table down tightly on its supporting ways by some means or other, but this is not fully effective because the surface against which clamping is exerted is a precision surface lubricated under pressure, thus tending to minimize the friction needed to hold the table immovable against heavy stress exerted against the work clamped thereon.

It is the object of my invention to avoid this difficulty and to that end I form an element to be clamped on the table itself, preferably integrally, and apply braking pressure to this element. In the preferred form this element is so arranged that the braking pressure as applied not only grips the element laterally but also tends to force the table downwardly somewhat.

Objects are to make such a clamp very strong and sturdy, and provide for adjustability thereof, and simple mode of operation.

An example of the novel device, selected for the purpose of illustrating the inventive concept, has been shown in the drawings, but from the appended claims it will be noted that the invention is not limited to the details of this construction.

Figure 1:
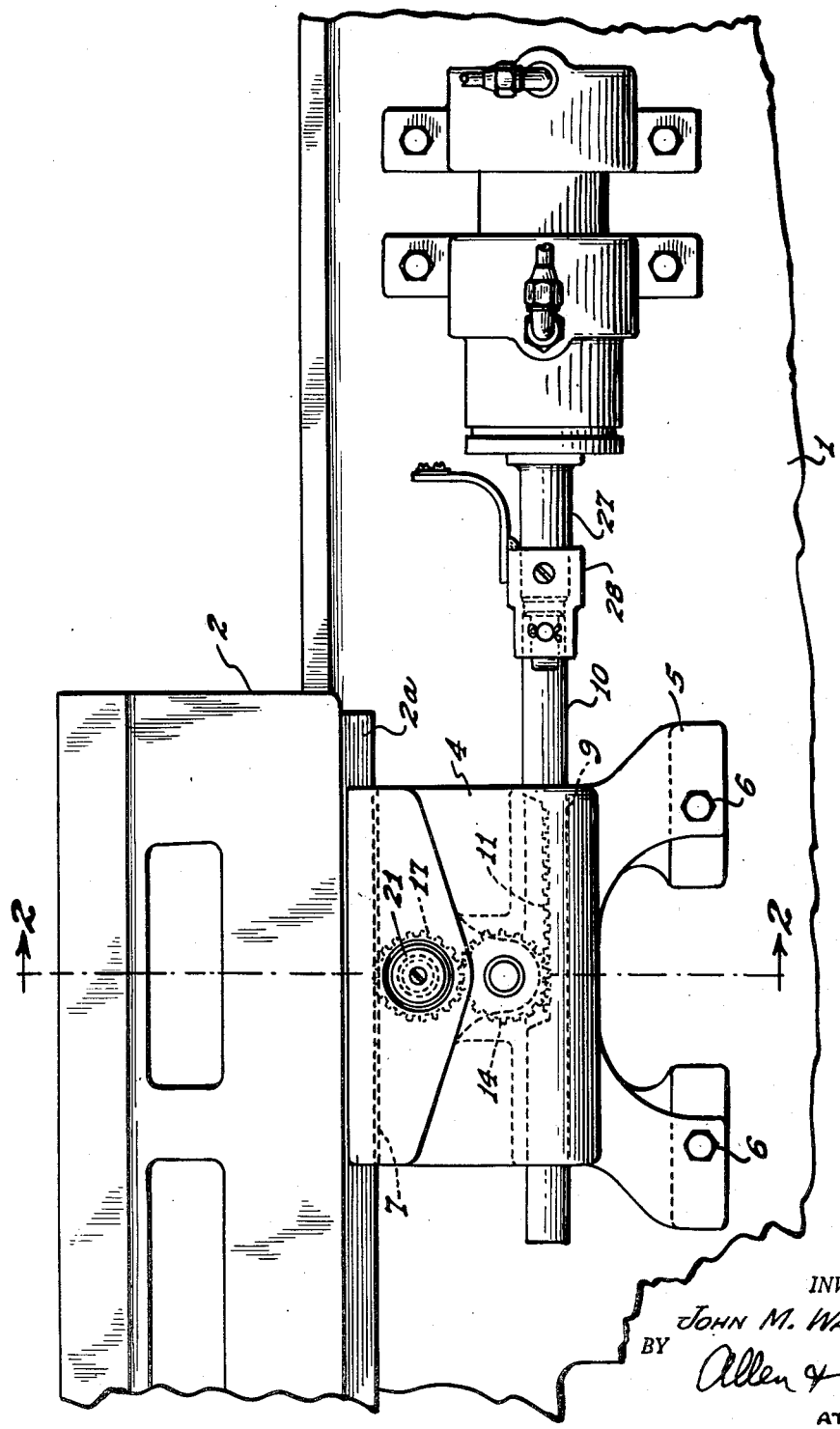
Figure 1 is a side elevation illustrating the clamp and power operating means therefor.
Figure 2:
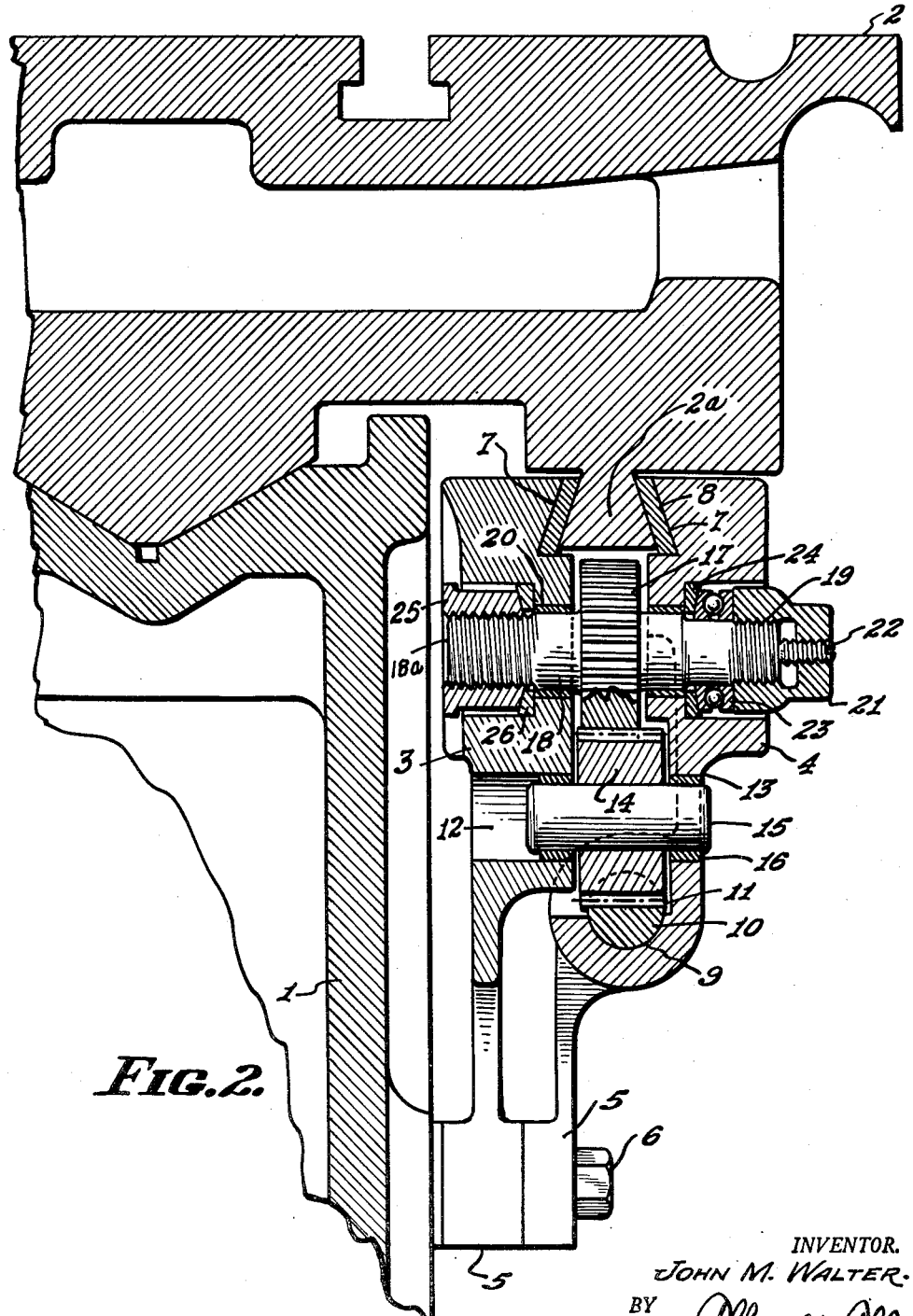
Figure 2 is a section on the line 2—2 of Figure 1.

In the illustrated device a bed is indicated at 1, and a work supporting table at 2. Beneath the overhang of the table where it projects along one side over the sides, I form integrally a longitudinal dovetail shaped depending rib 2a. This rib or rail could be secured to the overhang in other ways but it is preferred and quite simple to make it integral. The clamping device engages this rail, and is secured to the bed.

While variations in particular clamping devices are within the scope of my invention, I have shown one which consists of two plates 3, and 4, having legs 5, which are secured together and to the side of the bed as by bolts 6. The upper ends of the plates are formed with undercut edges 7, where they lie one on each side of the dovetail depending rail. Preferably a suitable brake lining as illustrated at 8 is secured at their undercut edges.

The plate 4 is shown as having a channel 9 therein in which is slidably held a rack bar 10, shaped as a rod and having rack teeth 11 on the upper face thereof. Both of the plates are provided with holes 12 and 13 respectively, in which is supported a pinion 14, on a pin 15, in bearings 16.

A preferably integral structure consisting of a gear 17 with spindle portions 18 and 19, is mounted in bearings 20 in the two clamp plates, with the gear lying between the two plates as does the pinion 14. The spindle portion 19 is fitted with a threaded nipple 21 which can be adjusted on the spindle end and held in place with a set screw 22. The nipple bears on a bearing race 23, retaining ball bearings between it and a raceway 24. The raceway 24 engages the base of the socket in the clamping plate 4 in which the nipple is located. This construction provides for adjustment of the clamping action of the two plates 3 and 4.

On the other spindle end 18 the threaded portion 18a thereof engages within a nut 25, which nut has a seat on a bearing ring 26 that lies in the base of the socket in plate 3 in which the nut is located. This nut is arranged to be slidable but not rotatable in the socket in the side plate 3, by having two flat faces engaging in grooves in the socket (not shown), and hence when the gear 17 is rotated the nut 25 will be drawn toward the gear, the spindle being provided with a thrust bearing by the nipple and bearing structure on its other spindle end.

The two plates are constrained toward each other by the gear and spindle arrangement described, and their natural resilience will tend to spread them somewhat. Thus to apply braking and clamping pressure to the dovetail rail on the table of the machine, the gear is rotated in one direction which pulls the two sides of the clamp together and grips the dovetail rail. To release the clamp the gear is rotated in the opposite direction which releases gripping pressure by the natural resilience of the structure. The effect of the clamp is to engage the two sides of the dovetail and also to force it downwardly somewhat, which acts to supply a very firm and immovable grip on the table, and does not tend to move the table lengthwise in the operation of clamping it. This is because the dovetail rib extends longitudinally of the table and the grip is on both sides of the rib.

In order to operate the gear and pinion 14, by means of the rack bar 19, I provide any suitable power means here shown to be a hydraulic device, the piston rod 27 whereof is connected to the rack bar. This may be by means of a universal joint as indicated at 28, which may be of any desired construction.

Having thus described my invention, what I claim as new and desire to secure by Letters Patent is:

1. Mechanisms for clamping, comprising a rail element moving with the table on a machine tool bed, a pair of plates arranged to engage the opposite sides of said rail element, a spindle connected to engage each of the plates, said spindle engaging at least one of the plates with a threaded connection, a gear for rotating said spindle mounted thereon between said plates, and a rack having sliding engagement with one of said plates at least and meshing with said gear, for actuating said mechanism.

2. The combination of claim 1 in which the spindle is provided with a thrust bearing on one of said plates such that the other plate has a threaded connection with said spindle.

3. The combination of claim 1 in which the said thrust bearing is adjustable on the spindle axially thereof.

4. A brake applying mechanism comprising a pair of plates the edges of which are shaped to engage the sides of a member projecting between them, a bed with respect to which said member is movable, means at the other end of said plates for bolting them to said bed, a rack bar slidably supported between said plates, a gear supported between said plates and having driving relation to said rack bar, said gear having a spindle, one end of which is rotatably supported in one of the plates, and the other end of which is threaded and equipped with a nut bearing on the other of the two plates.

5. The combination of claim 4 in which the rotatable support of the spindle in one of said plates comprises a thimble threaded on the spindle and having an antifriction bearing on the said plate.

6. The combination of claim 4 in which the rotatable support of the spindle in one of said plates comprises a thimble threaded on the spindle, and having a set screw to lock it in adjusted threaded position on said spindle, said thimble having a bearing on the plate.

7. The combination of claim 4 in which the rotatable support of the spindle in one of said plates comprises a thimble threaded on the spindle, and having a set screw to lock it in adjusted threaded position on said spindle, said thimble having an antifriction bearing against the plate.

JOHN M. WALTER.

REFERENCES CITED

The following references are of record in the file of this patent:

UNITED STATES PATENTS

| Number | Name | Date |
|---|---|---|
| 600,324 | Strub | Mar. 8, 1898 |
| 638,695 | Beeley | Dec. 12, 1899 |
| 1,511,231 | Miles et al. | Oct. 14, 1924 |
| 1,930,567 | Shaw | Oct. 17, 1933 |
| 2,291,665 | Turrettini | Aug. 4, 1942 |
| 2,296,954 | Schneider | Sept. 29, 1942 |
| 2,349,004 | Richards | May 14, 1944 |